(12) United States Patent
Cauffriez et al.

(10) Patent No.: US 8,349,760 B2
(45) Date of Patent: Jan. 8, 2013

(54) HOMOGENEOUS BED OF CATALYST AND A PROCESS FOR TRANSFORMING HYDROCARBONS INTO AROMATIC COMPOUNDS USING SAID BED

(75) Inventors: Herve Cauffriez, Oelienas (FR); Fabienne Le Peltier, Rueil Malmaison (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 1340 days.

(21) Appl. No.: 10/454,837

(22) Filed: Jun. 5, 2003

(65) Prior Publication Data

US 2004/0043896 A1 Mar. 4, 2004

(30) Foreign Application Priority Data

Jun. 7, 2002 (FR) .................................. 02/07.053

(51) Int. Cl.

| B01J 27/06 | (2006.01) |
| B01J 27/135 | (2006.01) |
| B01J 27/13 | (2006.01) |
| B01J 23/42 | (2006.01) |
| B01J 23/44 | (2006.01) |
| B01J 23/00 | (2006.01) |

(52) U.S. Cl. ........ 502/224; 502/227; 502/230; 502/339; 502/349; 502/352

(58) Field of Classification Search .................. 502/224, 502/227, 230, 339, 349, 352

See application file for complete search history.

(56) References Cited

U.S. PATENT DOCUMENTS

| 3,847,794 | A | * | 11/1974 | Rausch | 208/88 |
| 3,979,278 | A | * | 9/1976 | Hayes | 208/143 |
| 4,082,649 | A | * | 4/1978 | Pollitzer et al. | 208/111.1 |
| 4,356,081 | A | | 10/1982 | Gallagher et al. | |
| 4,791,087 | A | * | 12/1988 | Moser et al. | 502/227 |
| 4,923,595 | A | * | 5/1990 | Moser et al. | 208/139 |
| 4,964,975 | A | * | 10/1990 | Chao et al. | 208/139 |
| 5,106,809 | A | * | 4/1992 | Baird et al. | 502/223 |
| 5,128,300 | A | * | 7/1992 | Chao et al. | 502/227 |
| 5,198,404 | A | | 3/1993 | Arndt et al. | |
| 6,419,820 | B1 | * | 7/2002 | Bogdan et al. | 208/138 |
| 6,451,199 | B1 | | 9/2002 | Cauffriez et al. | |

FOREIGN PATENT DOCUMENTS

| FR | 2422711 | 11/1979 |
| FR | 2789332 | 8/2000 |
| WO | WO 9922861 | 5/1999 |

* cited by examiner

*Primary Examiner* — Patricia L Hailey

(74) *Attorney, Agent, or Firm* — Millen, White, Zelano & Branigan, P.C.

(57) ABSTRACT

The invention concerns a homogeneous bed of particles of a catalyst, said catalyst comprising at least one amorphous matrix, at least one noble metal, at least one additional metal M and at least one halogen, and in which, for a catalyst particle, $C_{Pt}$ is the local concentration of noble metal Pt;
$C_M$ is the local concentration of additional metal M;
$C_X$ is the local concentration of halogen;

said catalyst being in the form of a homogeneous bed of particles, in which across the diameter of the particle, at least 70% of the values $C_{Pt}/C_M$ or $C_{Pt}/C_X$ differ from the mean local ratio by at most 30%, and in which the mole ratio M/Pt in the catalyst is in the range 1.8 to 6.

24 Claims, No Drawings

HOMOGENEOUS BED OF CATALYST AND A PROCESS FOR TRANSFORMING HYDROCARBONS INTO AROMATIC COMPOUNDS USING SAID BED

The present invention relates to a homogeneous bed and to particles of catalyst with improved bimetallic and bifunctional effects, the catalyst particles having reduced local compositional fluctuations, which results in greatly improved catalytic performances, in particular activities and gasoline yields. Such a bed is termed "micron-scale homogeneous". Such particles can even be termed "nanometer-scale homogeneous". The invention also relates to a process for transforming hydrocarbons into aromatic compounds using said catalyst, such as a gasoline reforming process or an aromatic production process.

Catalysts for reforming gasoline and/or for producing aromatics are well known. They generally contain a matrix, at least one noble metal from the platinum family, at least one halogen and at least one promoter metal, also termed an additional metal.

Promoter metals more particularly include tin for regenerative processes and rhenium for fixed bed processes.

Catalysts for reforming gasoline and/or for producing aromatics are bifunctional catalysts with two essentially functions for producing correct performance: a hydrodehydrogenating function, which dehydrogenates napthenes and hydrogenates coke precursors, and an acid function, which isomerizes naphthenes and paraffins and cyclizes long chain paraffins. The hydrodehydrogenating function can be guaranteed by an oxide such as molybdenum oxide $MoO_3$, chromium oxide $Cr_2O_3$ or gallium oxide $Ga_2O_3$, or by a metal from column 10 (Ni, Pd, Pt). It is known that metals, in particular platinum, are far more active than oxide phases in hydrodehydrogenating reactions, and for this reason, metal catalysts have replaced supported oxide catalysts for gasoline reforming and/or for aromatics production. However, metals such as nickel, and to a lesser extent palladium and platinum, also have a hydrogenolysing activity that deleteriously affects the gasoline yield desired, for gasoline reforming and/or aromatics production. This hydrogenolysing activity can be considerably reduced, and thus the selectivity of the catalyst can be increased, by adding a second metal such as tin. Further, adding a second meal such as iridium or rhenium enhances the hydrogenating properties of platinum, which encourages hydrogenation of coke precursors and thus the stability of the catalyst. For those reasons, bimetallic catalysts are more successful than first generation monometallic catalysts. More recently, trimetallic catalysts have been introduced, which preserve the increased stability of bimetallic catalysts by increasing the gasoline selectivities of those catalysts.

Selectivity can also be increased in other manners. In International patent application WO-A-99/22864, it is indicated, for example, that catalyst performance could be substantially improved by controlling the relative local fluctuations in the ratio of the concentrations of noble metal (Pt) and of the additional metal (M) and/or the concentrations of the noble metal and the halogen. Thus, the noble metal-additional metal bimetallic effect and/or the bifunctional noble metal-acid effect are homogeneous in the particle bed, which improves overall performance in the process in which the catalyst is employed.

We have discovered, and this constitutes the tenor of the present invention, that the performance of the catalyst described in International patent application WO 99/22864 can be further improved if the molar ratio M/Pt is in the range 1.8 to 6. It has also been discovered that such a catalyst performs well when used in catalytic reforming not only at high pressure but also at pressures of less than 0.4 MPa, e.g. 0.3 MPa, down to atmospheric pressure.

More precisely, the invention concerns a catalyst comprising at least one amorphous matrix, at least one noble metal, at least one additional metal M and at least one halogen and in which, for a catalyst particle, $C_{Pt}$ is the local concentration of noble metal Pt;
$C_M$ is the local concentration of additional metal M;
$C_X$ is the local concentration of halogen;
said catalyst being in the form of a homogeneous bed of catalyst particles, in which the local dispersion of the value $C_{Pt}/C_M$ or $C_{Pt}/C_X$ is termed homogeneous, which corresponds to the fact that at least 70% of the values $C_{Pt}/C_M$ or $C_{Pt}/C_X$ for the catalyst bed differ from the mean local ratio by at most 30%, and in which the mole ratio M/Pt in the catalyst is in the range 1.8 to 6. Preferably, said mole ratio is in the range 1.8 to 5; more preferably, it is in the range 2 to 5.

The amorphous catalyst matrix is generally a refractory oxide such as magnesium, titanium or zirconium oxides, or alumina or silica, taken alone or as a mixture. The preferred support contains alumina or is constituted by alumina.

For gasoline reforming and/or aromatics production reactions, the preferred matrix is alumina; advantageously, the specific surface area is 50-600 $m^2/g$, preferably 150-400 $m^2/g$.

The catalyst also contains at least one noble metal from the platinum family (platinum, palladium, rhodium, iridium), preferably platinum. Advantageously, the catalyst can contain a noble metal (such as platinum) and iridium.

The additional metal M is selected from the group constituted by tin, germanium, lead, gallium, indium, thallium, rhenium, manganese, chromium, molybdenum and tungsten. In the case of regenerative gasoline reforming and/or aromatics production processes carried out in a moving bed, the preferred metal is tin; highly advantageously, it is associated with platinum (catalysts containing platinum, tin) and more advantageously again, the catalyst also contain tungsten (catalysts containing platinum, tin, tungsten).

In fixed bed processes, the preferred metal is rhenium; highly advantageously, it is associated with platinum (catalysts containing platinum, rhenium); more advantageously still, the catalyst contains indium (catalysts containing platinum, rhenium, indium); and tungsten can also be present (catalysts containing platinum, rhenium, tungsten or platinum, rhenium, indium, tungsten).

The halogen is selected from the group constituted by fluorine, chorine, bromine and iodine. Chlorine is preferred.

The catalyst catalytic quantities of components, e.g. generally 0.01% to 2% by weight of noble metal, 0.1% to 15% by weight of halogen and 0.005% to 10% by weight of additional metal. Preferably, in accordance with the invention, the catalyst contains at most 2% by weight of additional metal M; highly advantageously, more than 0.1% by weight of said metal. Under these preferred conditions, the catalyst will perform better due to the optimized bimetallic effect.

It should also be noted that the catalyst employed in gasoline reforming and/or aromatics production processes preferably contains practically no alkali.

The catalyst is present in the bed in the form of particles which can be beads, extrudates, trilobes or any other form in routine use.

$C_{Pt}$ is the local concentration of noble metal (expressed as the % by weight) (the noble metal is not necessarily platinum); $C_M$ is the local concentration (by weight) of the additional metal; and $C_X$ is the local concentration (by weight) of halogen.

The concentrations can also be expressed as the atomic %, as the relative fluctuations are the same.

The overall composition of the catalyst can be determined by X ray fluorescence of the catalyst in the powder state or by atomic absorption after acid attack of the catalyst.

The local composition on the micron scale as opposed to the overall composition of the catalyst can be measured using an electronic microprobe, optionally supplemented with STEM (scanning transmission electron microscopy). Said measurement can be made by determining the amounts of platinum and additional metal in zones of a few cubic microns across the diameter of a catalyst particle, termed units of measurement. That measurement allows the macroscopic distribution of the metals in the particles to be determined.

Analyses are carried out using a JEOL JA 8800 electronic microprobe (preferred apparatus), or optionally using a Microbeam type CAMEBAX, each provided with four wavelength dispersion spectrometers. The acquisition parameters are as follows: acceleration voltage 20 kV, current 30 nA, Pt Mα, Sn Lα, Cl Kα lines, and count time 20 s or 40 s depending on the concentration. The particles are coated with resin then polished to diameter.

It should be noted that the term "diameter" does not refer solely to a bead or extrudate shape, but more generally to any particle shape; the diameter is in fact the representative length of the particle on which the measurement is made.

The analyses are made on a representative sample of the bed or batch of catalyst which is to be used for the catalytic bed. The analyses should in our opinion be carried out on at least 5 particles, with at least 30 measurements per particle, uniformly distributed across the diameter.

$C_{Pt}$ is the local concentration of noble metal (expressed as the weight %); $C_M$ is the local concentration (by weight) of the additional metal; and $C_X$ is the local concentration (by weight) of halogen.

From local measurements of $C_{Pt}$, $C_M$ and $C_X$ (measurements corresponding to a given position on the diameter of a particle), the local ratios $C_{Pt}/C_M$ and/or $C_{Pt}/C_X$ can be calculated.

For each radial position, a mean local ratio $[C_{Pt}/C_M]_m$ and/or $[C_{Pt}/C_X]_m$ is calculated (mean of local ratios corresponding to different particles).

Then, the absolute values of the differences between each ratio $C_{Pt}/C_M$ measured locally and the corresponding mean local ratio $[C_{Pt}/C_M]_m$ can be determined. These values are termed the local dispersions.

In accordance with the invention, said dispersion is termed homogeneous, which means that at least 70%, preferably at least 80% of the values $C_{Pt}/C_M$ or $C_{Pt}/C_X$ for the bed of catalyst particles differ from the mean local ratio by at most 30%.

The local dispersion is then said to fall within a confidence interval of more than 30% for at least 70% of the particles.

Preferably, this criterion for the homogeneity of local dispersions is dropped to 30% to, preferably, 20%, advantageously 15% or 10%, or even 7% or 5%, i.e., the values differ from the mean local ratio by at most 20%.

A very important parameter for the catalytic performance of catalysts, in particular those used for reforming gasoline and/or aromatics production, is the halogen content, in particular the local concentration of halogen with respect to the local concentration of noble metal.

The halogen (usually chlorine) is responsible for the acid function of catalysts that carry out isomerization and cyclization of $C_6$-$C_{11}$ paraffins. An optimum halogen content exists for each catalyst. For halogen contents that are lower than the optimum content, the catalyst suffers from a drop in activity, in particular as regards dehydrocyclization of $P_7$-$P_9$ paraffins. For halogen contents that exceed this optimum content, the catalysts have an excessive cracking activity that results in high production of $C_3$-$C_4$ gas fuel, and thus a drop in gasoline yield. The optimum halogen concentration depends on the nature of the support, on its specific surface area and on its structure. It is often close to 1.0% by weight in commercial catalysts, but can be significantly lower or higher than this value for certain particular supports, or in the presence of doping elements such as silicon included in the support.

This means that local $C_{Pt}/C_X$ ratios differ significantly from the local mean ratio, resulting in mediocre catalytic performances.

Usually, the local $C_{Pt}/C_M$ ratio or the local $C_{Pt}/C_X$ ratio is constant across the diameter of the catalyst particle. The $C_{Pt}/C_M$ profile as a function of diameter is then a "flat profile", as are $C_{Pt}$, $C_M$ or $C_X$ (depending on the case) across the diameter. The noble metal and/or metal M and/or halogen is/are uniformly distributed in the particle.

For a given particle (preferably a bead), absolute values for the differences between each locally determined ratio $C_{Pt}/C_X$ and the mean ratio $[C_{Pt}/C_M]P$ or $[C_{Pt}/C_X]_p$ in the particle can be determined. These values are termed the radial dispersion in the particle.

In accordance with the invention, said dispersion is termed homogeneous for each particle, which means that at least 70% of the values, preferably 80%, differ from the mean value in the particle by at most 30%.

Preferably, this radial dispersion is dropped from 30% to, preferably, 20%, advantageously 15%, or 10%, or to 7% or even 5%.

In the same manner as before, the radial dispersion corresponds to a confidence interval of more than 30% for at least 70% of the particles.

For a given batch of catalyst (for example, for good representativity, at least 5 particles, at least 30 measurements per particle), it is possible to determine the absolute values of the differences between each locally determined ratio $C_{Pt}/C_M$ or $C_{Pt}/C_X$ and the overall mean ratio $[C_{Pt}/C_M]_L$ or $[C_{Pt}/C_X]_L$ in the batch (mean of all of the ratios in all of the particles). These values are termed the overall dispersion.

In accordance with the invention, said dispersion is termed homogeneous, which means that at least 70% of values, preferably 80%, differ from the mean value in the batch (overall mean ratio) by at most 30%.

Preferably, said overall dispersion is dropped from 30% to, preferably, 20%, advantageously 15%, or 10%, or 7% or even 5%.

In the same manner as before, the radial dispersion corresponds to a confidence interval of more than 30% for at least 70% of the particles.

It is also advantageous to prepare catalysts with different concentrations $C_{Pt}$, $C_M$ or $C_X$ in the core and at the periphery. Said catalysts have distribution profiles that are termed "dished" or "domed". Said catalysts with dish or dome $C_M$ or $C_{Pt}$ distributions are advantageous for certain applications in which reagent/product diffusion rate effects are sought in the catalyst.

In this case, the value of the mean local ratio $[C_{Pt}/C_M]_m$ varies as a function of the particle diameter. This variation can substantially follow a parabolic curve.

A further distribution type is the "crust" type, in which the noble metal and/or metal M are distributed on the surface.

In general, the core/edge ratio of the concentrations $C_{Pt}$, $C_M$ or $C_X$ in the centre and at the periphery of the catalyst particles can be between 0.1 and 3.

In a preferred variation, the catalyst contains at least one metal M and the noble metal (Pt preferred) uniformly distributed in the catalyst particle.

In a further possibility, the catalyst contains at least one metal M uniformly distributed in all of the catalyst particles, the noble metal being dish distributed in said particles. In a further variation, at least one metal M is uniformly distributed in all of the catalyst particles, the noble metal being "crust" distributed in said particles.

Advantageously, in the cases cited above, metal M is tin. Preferably, the platinum and tin are "dish" distributed.

Highly preferably, the catalyst contains at least one metal M uniformly distributed through all of the catalyst particles, the noble metal also being uniformly distributed in the catalyst particles.

In one technique in accordance with the invention, the catalyst is obtained by impregnating an organic solution of at least one compound of said metal M, the volume of the solution preferably being equal to the retention volume of the support or in excess with respect to that volume. Metal M is introduced in the form of at least one organic compound selected from the group constituted by complexes of metals M and hydrocarbyl metals such as metal alkyls, cycloalkyls, aryls, alkylaryls and arylalkyls. After leaving the solid an the impregnating solution in contact for several hours, the product is dried. Normally, the method is terminated by calcining between 300° C. and 600° C., preferably in a stream of air for several hours. The solid obtained is then impregnated using an aqueous or organic solution of at least one compound of a group VIII metal, the volume of the solution preferably being in excess with respect to the retention volume of the support or equal to that volume. After being in contact for several hours, the product obtained is dried then calcined in air between 300° C. and 600° C., preferably in a stream of air for several hours.

In a further method in accordance with the invention, the tin can be introduced during the synthesis of alumina using a sol-gel type technique (co-precipitation). As an example, a mixed tin-alumina gel can be obtained by hydrolyzing an organic solution of $Sn(OR)_4$ and $Al(OR')_4$ in a solvent such as ROH or R'OH. R and R' can designate a methyl, ethyl, isopropyl, n-propyl, butyl group or a heavier group such as n-hexyl. The alcoholic solvent must be severely dehydrated before introducing the tin and aluminium alcoholates. Hydrolysis can be carried out by adding water to the mixture or by adding an anhydrous carboxylic acid followed by slow etherification (solvolysis) under the influence of heat. The second technique generally results in more homogeneous mixed $Al_2O_3$—$SnO_x$ oxides as it leads to the homogeneous and simultaneous formation of water in the mixture. The reactivity of tin alcoholates towards water (hydrolysis) is generally greater than that of aluminium alcoholates, but it decreases with the length of the alkyl chain R. The molecular weight of the groups R and R' can be selected so that the reactivity of the corresponding aluminium and tin alcoholates are comparable. This can further improve the homogeneity of the distribution of metals in the mixed gels obtained. Tin and aluminium can also be co-precipitated in an aqueous solution, for example by dissolving $SnCl_2$ and $AlCl_3$ in a solution acidified with HCl, then pouring the acidic solution in the form of microdroplets (mist, nebulization) into water with a pH in the range 6 to 9.

The metals can be introduced using any technique that is known to the skilled person. The additional metal can be introduced during synthesis of the alumina using a sol-gel technique (co-precipitation) or during forming of the catalyst (extrusion, oil drop, or any other known technique).

In accordance with the invention, the catalyst described above is employed in processes for gasoline reforming and aromatics production. Reforming processes can increase the octane number of gasoline fractions derived from distilling crude oil and/or other refining products. The aromatics production processes provide bases (benzene, toluene and xylenes) that can be used in petrochemistry. Said processes have a supplemental advantage in that they contribute to the production of large quantities of hydrogen, vital for refinery hydrogenation and hydrotreatment processes. These two processes are distinguished from each other by their operating conditions and the composition of the feed, as is known to the skilled person.

In general, a typical feed processed by these processes contains paraffinic, napthenic and aromatic hydrocarbons containing 5 to 12 carbon atoms per molecule. That feed is defined, inter alia, by its density and its composition by weight. This feed is brought into contact with the catalyst of the present invention at a temperature in the range 400° C. to 700° C. The mass flow rate of the treated feed per unit mass of catalyst can be from 0.1 to 10 kg/kg/h. The operating pressure can be fixed at between atmospheric pressure and 4 MPa. Some of the hydrogen produced is recycled at a molar recycle ratio in the range 0.1 to 10. This ratio is the mole ratio of the flow rate of the recycled hydrogen to the flow rate of the feed.

The following examples illustrate the invention without limiting its scope.

EXAMPLE 1

In Accordance with the Prior Art

A catalyst A was prepared by impregnating with an organometallic tin complex. A quantity of 100 g of an alumina support was brought into contact with 60 cm³ of a solution of n-heptane containing 0.14 g of tin in the form of tetrabutyltin, $Sn(Bu)_4$. The support was a γ alumina with a specific surface area of 210 m²/g. After reacting for 3 hours at ambient temperature, the solid was dried for 1 hour at 120° C. then calcined at 500° C. for 2 hours. 100 g of this solid was then brought into contact with 500 cm³ of an aqueous solution of hydrochloric acid and hexachloroplatinic acid containing 0.25 g of platinum. It was left in contact for 3 hours, dried for 1 hour at 120° C. then calcined for 2 hours at 500° C. The Sn/Pt mole ratio of this catalyst was 0.92.

EXAMPLE 2

In Accordance with the Prior Art

A catalyst B containing 0.3% by weight of platinum and 0.32% by weight of tin and 1% of chlorine was prepared by impregnating with an organometallic tin complex. A quantity of 100 g of an alumina support was brought into contact with 60 cm³ of a solution of n-heptane containing 0.32 g of tin in the form of tetrabutyltin, $Sn(Bu)_4$. The support was a γ alumina with a specific surface area of 210 m²/g. After reacting for 3 hours at ambient temperature, the solid was dried for 1 hour at 120° C. then calcined at 500° C. for 2 hours.

Platinum was then introduced into 100 g of this solid by contact with 500 cm³ of a solution of toluene containing 0.3 g of platinum in the form of platinum bis-acetylacetonate. It was left in contact for 3 hours, dried for 1 hour at 120° C. then calcined for 2 hours at 500° C. The solid was impregnated with 600 cm³ of an aqueous hydrochloric acid solution to introduce 1% by weight of Cl (with respect to the catalyst). It was left in contact for 3 hours, drained, the solid was dried for 1 hour at 120° C. and then calcined for 2 hours at 500° C. The Sn/Pt mole ratio of this catalyst was 1.76.

EXAMPLE 3

In Accordance with the Invention

A catalyst C was prepared by impregnating with an organometallic tin complex. A quantity of 100 g of an alumina support was brought into contact with 60 cm³ of a solution of n-heptane containing 0.45 g of tin in the form of tetrabutyltin, Sn(Bu)$_4$. The support was a γ alumina with a specific surface area of 210 m²/g. After reacting for 3 hours at ambient temperature, the solid was dried for 1 hour at 120° C. then calcined at 500° C. for 2 hours. 100 g of this solid was then brought into contact with 500 cm³ of an aqueous solution of hydrochloric acid and hexachloroplatinic acid containing 0.30 g of platinum. It was left in contact for 3 hours, dried for 1 hour at 120° C. then calcined for 2 hours at 500° C. The Sn/Pt mole ratio of this catalyst was 2.46.

EXAMPLE 4

Evaluation of Performances in Catalytic Reforming

Samples of catalysts A, B and C prepared as described above were tested by transforming a feed with the following characteristics:

| | |
|---|---|
| Density at 20° C. | 0.753 kg/dm³ |
| Research octane number | ~60 |
| Paraffins content | 49.4% by volume |
| Naphthenes content | 35.1% by volume |
| Aromatics content | 15.5% by volume |

This transformation was carried out in the presence of hydrogen under the following operating conditions:

| | |
|---|---|
| Temperature | 490° C. |
| Total pressure | 0.30 MPa |
| Feed flow rate | 2.0 kg per kg of catalyst |

Prior to injecting the feed, the catalysts were activated at high temperature in hydrogen for 2 hours. The performances obtained after 24 hours of operation are shown in the table below.

| Sample | Reformate yield (wt %) | Research octane number | Aromatics yield (wt %) | C4- yield (wt %) |
|---|---|---|---|---|
| A | 90.7 | 103.7 | 72.6 | 5.3 |
| B | 90.9 | 103.7 | 73.3 | 5.1 |
| C | 91.7 | 103.7 | 76.5 | 4.7 |

The table shows that the performance of catalyst C in accordance with the present invention is substantially improved compared with prior art compositions.

The preceding examples can be repeated with similar success by substituting the generically or specifically described reactants and/or operating conditions of this invention for those used in the preceding examples.

The entire disclosures of all applications, patents and publications, cited herein and of corresponding French application No. 02/07.053, filed Jun. 7, 2002 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst comprising at least one amorphous matrix, at least one noble metal, at least one additional metal M and at least one halogen, and in which, for a catalyst particle,
   $C_{Pt}$ is the local concentration of noble metal Pt;
   $C_M$ is the local concentration of additional metal M;
   $C_X$ is the local concentration of halogen;
   said catalyst being in the form of a homogeneous bed of catalyst particles, in which the local dispersion of the value $C_{Pt}/C_M$ or $C_{Pt}/C_X$ is termed homogeneous, which corresponds to the fact that at least 70% of the values $C_{Pt}/C_M$ or $C_{Pt}/C_X$ for the catalyst bed differ from the mean local ratio by at most 30%, said catalyst being characterized in that the mole ratio M/Pt is in the range of above 3.5 to 6 and in that the at least one additional metal M consists essentially of tin, and the at least one noble metal consists essentially of platinum.

2. A catalyst according to claim 1 in which, for a batch of particles, the overall dispersion of the value $C_{Pt}/C_M$ or $C_{Pt}/C_X$ is termed homogeneous, corresponding to the fact that at least 70% of the values $C_{Pt}/C_M$ or $C_{Pt}/C_X$ differ from the overall mean ratio by at most 30%.

3. A catalyst according to claim 1 in which, for a catalyst particle, the radial dispersion of the value $C_{Pt}/C_M$ or $C_{Pt}/C_X$ is termed homogeneous, which corresponds to the fact that at least 70% of the values $C_{Pt}/C_M$ or $C_{Pt}/C_X$ differ from the mean ratio in the particle by at most 30%.

4. A catalyst according to claim 1, containing 0.01% to 2% by weight of noble metal, more than 0.1% to at most 2% by weight of metal M and 0.1%-15% by weight of halogen.

5. A catalyst according to claim 1, wherein the halogen is chlorine.

6. A catalyst according to claim 1, wherein the ratio between the concentrations of $C_{Pt}$ or $C_M$ or $C_X$ in the catalyst core and the respective concentrations $C_{Pt}$ or $C_M$ or $C_X$ at the catalyst periphery is 0.1 to 3.

7. A catalyst according to claim 1, wherein at least one metal M is distributed uniformly throughout the catalyst, the noble metal also being distributed uniformly through the catalyst particle.

8. A catalyst according to claim 1, wherein at least one metal M is distributed uniformly throughout the catalyst, the noble metal having a different concentration at the catalyst core and the catalyst periphery.

9. A catalyst according to claim 1, wherein at least one metal M is distributed uniformly throughout the catalyst, the noble metal being distributed on the catalyst surface.

10. A catalyst according to claim 1, consisting essentially of platinum and tin in different concentrations at the catalyst periphery and the catalyst core.

11. In a process comprising catalytically transforming hydrocarbons into aromatic compounds, the improvement wherein the catalyst is according to claim 10.

12. A process according to claim 11, comprising reforming gasoline, in which the pressure of said transformation is less than 0.4 MPa.

13. A catalyst according to claim 1, consisting essentially of platinum and iridium as the noble metal.

14. In a process comprising catalytically transforming hydrocarbons into aromatic compounds, the improvement wherein the catalyst in according to claim 1.

15. A process according to claim 14, comprising reforming gasoline, in which the pressure of said transformation is less than 0.4 MPa.

16. A catalyst according to claim 1, wherein the mole ratio of M/Pt is in the range of 4 to 6.

17. In a process comprising catalytically transforming hydrocarbons into aromatic compounds, the improvement wherein the catalyst is according to claim 16.

18. A catalyst according to claim 1, wherein the mole ratio M/Pt is in the range of 4 to about 5.

19. In a process comprising catalytically transforming hydrocarbons into aromatic compounds, the improvement wherein the catalyst is according to claim 18.

20. A catalyst according to claim 1, wherein the mole ratio M/Pt is in the range of 4.5 to 5.5.

21. In a process comprising catalytically transforming hydrocarbons into aromatic compounds, the improvement wherein the catalyst is according to claim 20.

22. A catalyst according to claim 1, wherein the mole ratio M/Pt is about 4.

23. A catalyst comprising at least one amorphous matrix, at least one noble metal, at least one additional metal M and at least one halogen; and in which, for a catalyst particle, $C_{Pt}$ is the local concentration of noble metal Pt;

$C_M$ is the local concentration of additional metal M;

$C_X$ is the local concentration of halogen;

said catalyst being in the form of a homogeneous bed of catalyst particles, in which the local dispersion of the value $C_{Pt}/C_M$ or $C_{Pt}/C_X$ is termed homogeneous, which corresponds to the fact that at least 70% of the values $C_{Pt}/C_M$ or $C_{Pt}/C_X$ for the catalyst bed differ from the mean local ratio by at most 30%, said catalyst being characterized in that the mole ratio M/Pt is in the range of above 3:1 to 6:1 and in that the at least one additional metal M consists essentially of tin, and the at least one noble metal consists essentially of platinum.

24. In a process comprising catalytically transforming hydrocarbons into aromatic compounds, the improvement wherein the catalyst is according to claim 23.

\* \* \* \* \*

UNITED STATES PATENT AND TRADEMARK OFFICE
CERTIFICATE OF CORRECTION

PATENT NO. : 8,349,760 B2
APPLICATION NO. : 10/454837
DATED : January 8, 2013
INVENTOR(S) : Herve Cauffriez et al.

Page 1 of 1

It is certified that error appears in the above-identified patent and that said Letters Patent is hereby corrected as shown below:

In the Claims:

Column 10, line 14 (Claim 23), reads: "of above 3:1 to 6:1 and in that the at least one additional"
It should read: -- of 3:1 to 6:1 and in that the at least one additional --.

Signed and Sealed this
Nineteenth Day of March, 2013

Teresa Stanek Rea
*Acting Director of the United States Patent and Trademark Office*